US007325662B2

(12) United States Patent
Maguire

(10) Patent No.: US 7,325,662 B2
(45) Date of Patent: Feb. 5, 2008

(54) DRY FRICTION LAUNCH CLUTCH FOR AN AUTOMATIC TRANSMISSION AND METHOD

(75) Inventor: Joel M. Maguire, Northville, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 271 days.

(21) Appl. No.: 11/129,584

(22) Filed: May 13, 2005

(65) Prior Publication Data

US 2006/0254872 A1 Nov. 16, 2006

(51) Int. Cl.
*F16D 13/50* (2006.01)

(52) U.S. Cl. .................................. 192/3.51; 192/70.27

(58) Field of Classification Search ................ 192/3.52
See application file for complete search history.

(56) References Cited

U.S. PATENT DOCUMENTS 3,068,979 A * 12/1962 Arkus-Duntov ......... 192/110 R
4,159,052 A * 6/1979 Ernst et al. ................... 192/98
4,222,283 A 9/1980 Nagy .......................... 74/467
5,421,440 A * 6/1995 Kumagai ..................... 192/90
5,836,849 A * 11/1998 Mathiak et al. ............. 475/269
6,471,616 B2 10/2002 Stevenson ................... 475/296
6,511,399 B2 1/2003 McCollum Etchason et al. .......................... 477/107
6,827,664 B2 12/2004 Stevenson et al. .......... 475/275
2001/0022245 A1* 9/2001 Rogg ........................ 180/65.2

FOREIGN PATENT DOCUMENTS

JP 56143849 A * 11/1981

* cited by examiner

*Primary Examiner*—Richard M Lorence

(57) ABSTRACT

A powertrain for a vehicle includes a dry friction clutch connected between an engine output member and a transmission input member. The dry friction clutch is selectively engagable to transfer torque from the engine output member to the transmission input member to launch the vehicle. A method of redesigning a powertrain is also provided.

7 Claims, 4 Drawing Sheets

DRY FRICTION LAUNCH CLUTCH FOR AN AUTOMATIC TRANSMISSION AND METHOD

TECHNICAL FIELD

The invention relates to launch of an automatic transmission. Specifically, the invention relates to the use of a dry friction clutch mounted between an engine and the transmission to launch the transmission.

BACKGROUND OF THE INVENTION

The launch of an automatic transmission, i.e., the transfer of torque from an engine or power source to the transmission at engine start-up is typically accomplished by a traditional torque converter that transfers torque via fluid coupling or by a wet clutch. The use of dry friction clutches existing within a transmission for ratio changing purposes to also serve as launch clutches has also been investigated. An optimal launch system would not increase the required fluid volume within a transmission and would not shorten fluid life. Additionally, an optimal launch system would not compromise fuel economy and would provide a clutch with a long component life.

SUMMARY OF THE INVENTION

A powertrain for a vehicle includes a dry friction clutch connected between and engine output member of an engine and an automatic transmission input member. The dry friction clutch is selectively engagable to transfer torque from the engine output member to the transmission input member, with or without speed ratio change, to launch the vehicle and thereby provide torque at a transmission output member after flowing through a plurality of selectively engagable gears within the transmission that allow multiple speed ratios at the transmission output member. By utilizing a dry friction clutch, a lower mass, more optimally packaged launch mechanism is provided at a lower cost than a traditional torque converter. Additionally, greater proved fuel economy may be achieved than with the traditional torque converter, as a more targeted torque for a given engine input speed may be achieved (e.g., by utilizing controlled slip) than with respect to the fixed characteristic of torque versus speed available with a torque converter. Additionally, in comparison to a wet clutch, the dry friction clutch does not cause a deterioration in oil life, and, if used in place of a torque converter on existing transmission designs, may utilize the existing hydraulic control system without a disruption of oil level for control of the dry clutch. With respect to a wet clutch, the dry clutch does not have the potential for shudder and increased spin losses. Also, the dry clutch may be controlled such that it is normally in a closed position to allow torque transfer from the engine to the transmission even in the event of electrical power failure.

Accordingly, the dry friction clutch may include a pressure plate and a flywheel both of which are mounted with respect to the engine output member for rotation therewith. The dry friction clutch may also include a clutch disk mounted with respect to the transmission input member for rotation therewith. The pressure plate is selectively axially movable to contact the clutch disk, thereby engaging a friction surface of the flywheel with a friction surface of the clutch disk for torque transfer.

The dry friction clutch may further include a spring plate mounted concentrically with respect to the engine output member for rotation therewith and pivotably connected with respect to the pressure plate. A bearing is positioned adjacent to the spring plate and radially displaced from the pressure plate. The bearing is selectively axially movable to pivot the spring plate with respect to the pressure plate, to move the pressure plate axially away from the clutch disk, thereby disengaging the clutch disk from the flywheel.

The powertrain may include an actuator having a cylinder and a piston controllable to selectively slide axially within the cylinder. The piston is connected to the bearing to move the bearing axially. Preferably, if the transmission was originally designed for use with torque converters, the same volume of hydraulic fluid necessary to control a torque converter clutch is required within the cylinder to slide the piston; thus, the same hydraulic control requirements are utilized and transmission oil level is not changed.

As an alternative to the actuator, the powertrain may include a motor having a shaft operatively connected with the bearing. The motor is operable to turn the shaft which thereby moves the bearing axially. Preferably, a throwout fork is connected between the shaft and the bearing and is moved axially by the shaft. Axial movement of the throwout fork is translated to the bearing. Preferably, the motor is controllable using the same pulse modulated width (PWM) signal used to control a torque converter clutch when a torque converter is used with the transmission. Thus, an existing torque converter clutch PWM signal provided by a transmission control unit may be used to control engagement of the friction launch clutch via the motor if the transmission was originally designed for use with a torque converter.

A sleeve may be mounted coaxially with the transmission input member. The sleeve has a radially extending hub interconnecting with the spring plate for rotation therewith. Preferably, the radially extending hub and the spring plate are both castellated to interconnect for common rotation. A pump or other transmission component may be operatively connected to the sleeve such that the sleeve may drive the pump or other component. Because the sleeve rotates at engine speed through its rigid interconnection with the engine output member, the transmission component may be driven via the sleeve even when the clutch is disengaged.

Additionally, a damping element such as a torsion spring may be operatively connected between the clutch disk and the transmission input member for damping engine vibrations.

The dry friction launch clutch described above is preferably compatible with existing transmission designs so that it may replace a torque converter with minimal changes to the transmission control scheme. Accordingly, a method of redesigning a powertrain includes providing an automatic transmission having a torque converter with a predetermined control requirement and replacing the torque converter with a dry friction launch clutch having the same predetermined control requirement.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
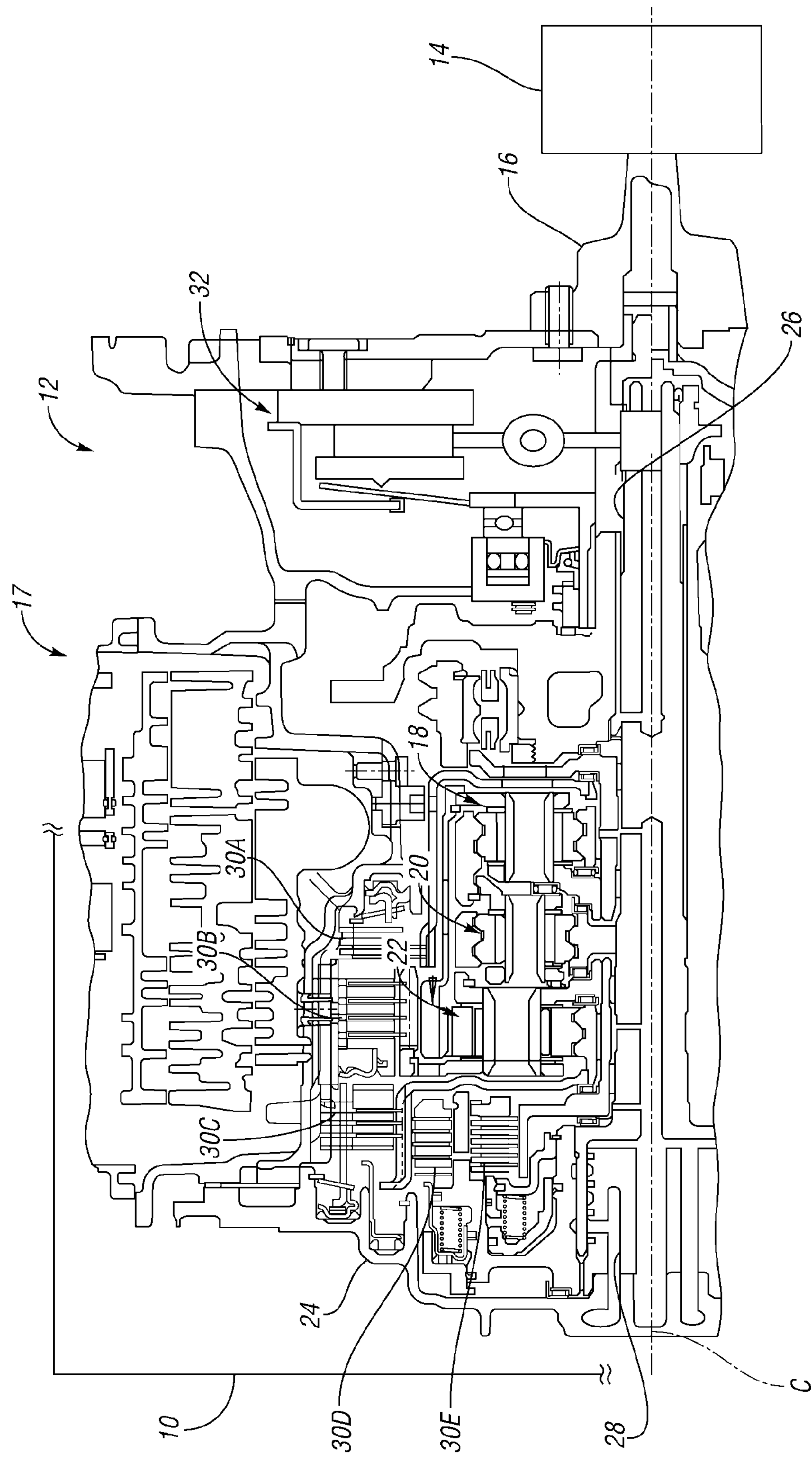
FIG. 1 is a schematic cross-sectional view of the top half of a transmission connected with an engine through a dry friction launch clutch and an actuator for selectively engaging the launch clutch.

Referring to the drawings, where like reference numbers refer to like components, FIG. 1 depicts a vehicle 10 having a powertrain 12 that includes an engine 14 having an engine output member 16. The powertrain 12 also includes an automatic transmission 17. The transmission 17 includes a first, second and third planetary gear sets 18, 20 and 22, respectively. Each planetary gear set 18, 20, 22 includes a sun gear, a planet carrier, and a ring gear, which are selectively connectable with one another, with a transmission casing 24, with a transmission input member 26 or with a transmission output member 28, and which rotate about a transmission centerline C, to transmit torque from the input member 26 to the output member 28 at varying speed ratios. Various torque-transmitting mechanisms 30A, 30B, 30C, 30D and 30E are selectively engagable to engage the various gears in the planetary gear sets 18, 20, 22 with one another or with the transmission casing 24, the transmission input member 26 or the transmission output member 28, as is well understood by those skilled in the art.

To transfer torque from the engine output member 16 to the transmission input member 26, a dry friction clutch 32 is connected between the engine output member 16 and the transmission input member 26 and is coaxially-aligned with each. The clutch 32 is selectively engagable to transfer torque between the engine output member 16 and the transmission input member 26 to launch the vehicle 10.

Figure 2:
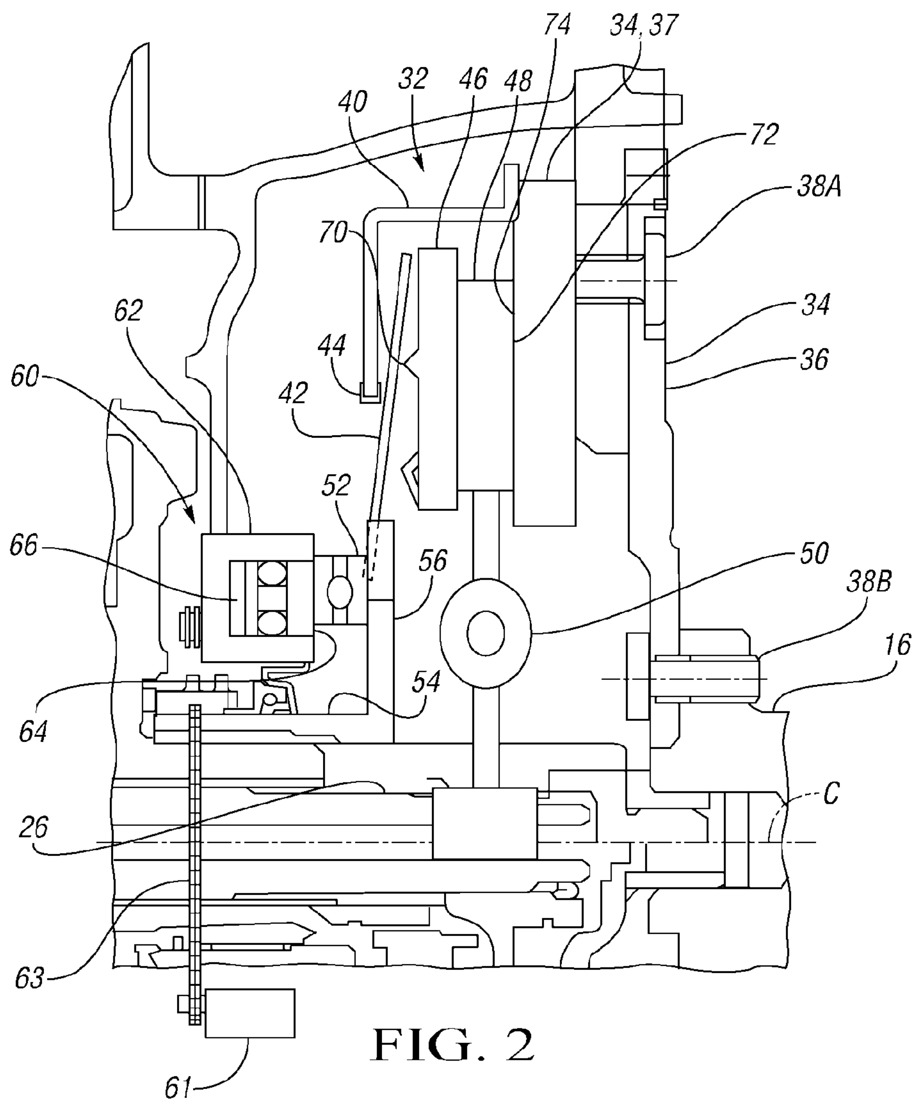
FIG. 2 is a schematic cross-sectional illustration in fragmentary view of the dry friction launch clutch of FIG. 1 connected between the engine and transmission.

Referring to FIG. 2, the dry friction clutch 32 includes a flywheel 34 which includes a flywheel hub 36 and a backing plate 37. The flywheel hub 36 is rigidly connected to the backing plate 37 and to the engine output member 16 with fasteners 38A, 38B, respectively, which may be bolts or other fastening devices. A cover plate 40 is secured to the backing plate 37 of the flywheel 34. The cover plate 40 is secured to the backing plate 37 by fasteners (not shown) as is well understood by those skilled in the art. A spring plate 42 is generally centrally pivoted by annular pivot 44 secured to the cover plate 40, and normally biases a pressure plate 46 in contact with a clutch disk 48 to engage the clutch disk 48 with the backing plate 37. The clutch disk 48 is connected for rotation with the transmission input member 26. An optional damping element 50 may be disposed between the clutch disk 48 and the input member 26 to absorb engine vibrations.

A clutch throwout bearing 52 is connected to a sleeve 54 that rotates coaxially about the transmission input member 26. A radially extending hub 56 of the sleeve 54 interconnects with the spring plate 42, as will be described in further detail below with respect to FIG. 3.

An actuator 60 includes a cylinder 62 concentrically disposed about the transmission input member 26 (and also about the transmission center line C). A piston 64 is slideable within the cylinder 62 via control of hydraulic fluid within a cylinder chamber 66. The cylinder chamber 66 may be filled with transmission fluid under control by a transmission control unit (not shown), as will be well understood by those skilled in the art, to extend or retract the piston 64, which in turn moves the bearing 52 and sleeve 54 axially to compress or release the spring plate 42 which releases or applies the pressure plate 46 to the clutch disk 48, respectively. A transmission pump 61 may be operatively connected with the sleeve 54, such as by a chain 63, as is well understood by those skilled in the art, such that the rotation of the sleeve 54 drives the pump 61. As described above, the spring plate 42, the plate cover 40, the backing plate 37 and the flywheel hub 36 of the flywheel 34 are all connected for rotation with the engine output member 16 (as is the sleeve 54 via its interconnection with the spring plate 42, as described below with respect to FIG. 3), and therefore rotate at the same speed as the engine 14. Notably, the sleeve 54 rotates at engine speed even when the dry friction clutch 32 is disengaged; therefore, the pump 61 may be driven by the sleeve 54 even during clutch disengagement.

As described above, when the actuator 60 is controlled to extend the piston 64 toward the clutch disk 48, the spring plate 42 compresses via the bearing 52 to release the pressure plate 46 from the clutch disk 48 and thereby disengage the clutch disk 48 from the backing plate 37. The spring plate 42 contacts the pressure plate 46 at a fulcrum 70 to move the pressure plate 46 axially. Conversely, when the actuator 60 is controlled to retract the piston 64 within the cylinder 62, the bearing 52 moves axially away from the clutch disk 48 to pivot the spring plate 42 via the annular pivot 44 to move the pressure plate 46 into contact with the clutch disk 48. A friction surface 72 of the clutch disk 48 then comes into contact with an opposing adjacent friction surface 74 of the backing plate 37. Notably, the frictional contact between the adjacent friction surfaces 72, 74 is not lubricated; thus, the heat of frictional contact is dissipated by the pressure plate 46 and the flywheel 34, as is understood by those skilled in the art. Lubrication fluid is not required for cooling the friction surfaces 72, 74. Thus, associated spin losses and pumping losses are not encountered.

Figure 5:
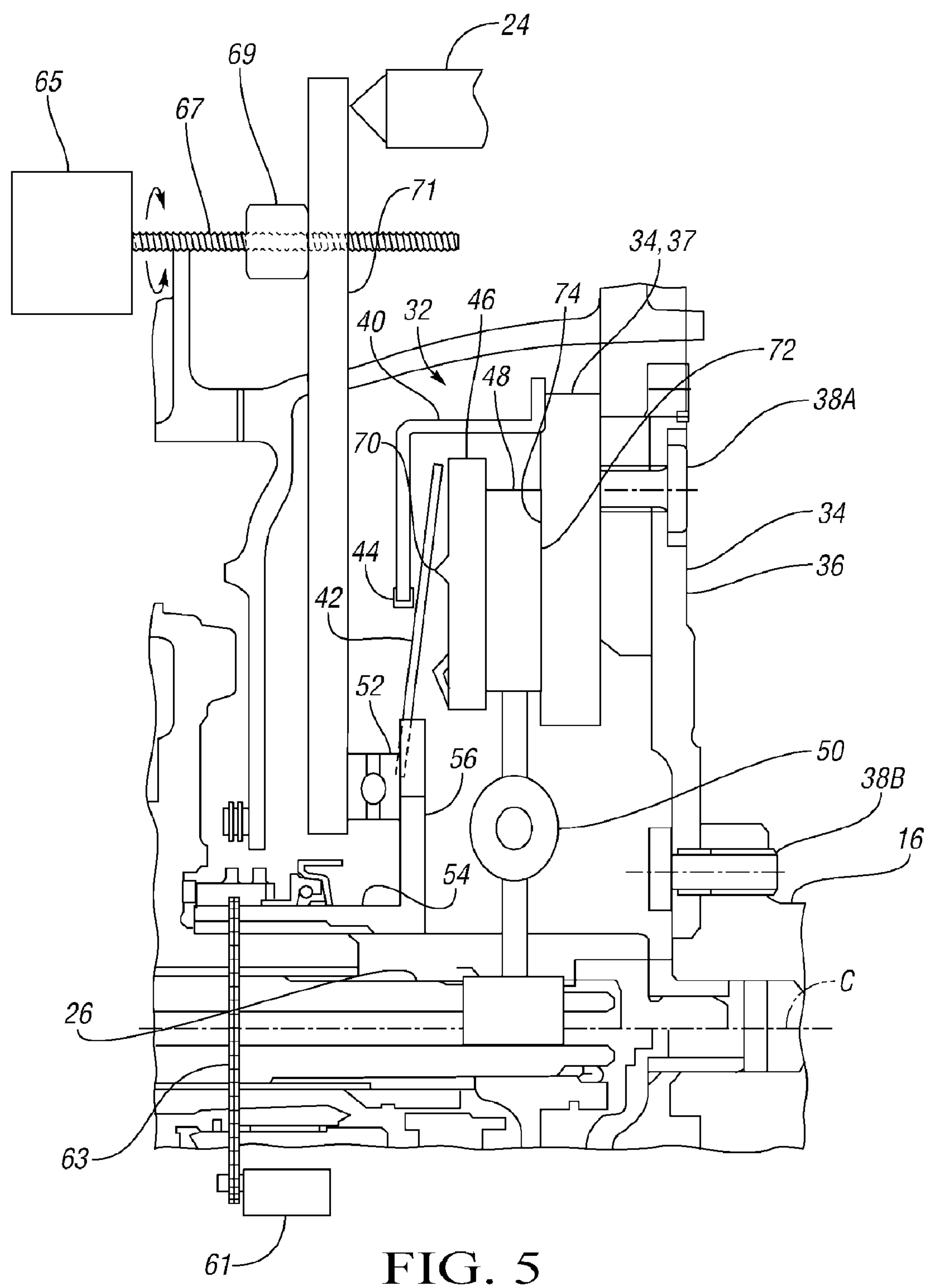
FIG. 5 is a schematic illustration in fragmentary view of the dry friction launch clutch of FIG. 1 with a motor and throwout fork for selectively engaging the launch clutch.

Referring to FIG. 5, as an alternative to the actuator 60 with the cylinder 62 and piston 64, an electric motor 65 having a threaded shaft 67 that mates with a threaded nut 69 and extends through a throwout fork 71 may be employed to move the bearing 52 axially to thereby compress the spring plate 42. The throwout fork 71 is preferably counterbalanced by the transmission casing 24. The motor 65 may be mounted within the transmission 17 in any manner known to those skilled in the art. Because transmission control modules typically are configured to relay a pulse modulated width control signal (PWM), which is an accepted means of regulating electric motors (and also hydraulic actuators 60), a control module (not shown) utilized with the transmission 17 would be capable of controlling the electric motor 65 or the hydraulic actuator 60 via the PWM control signal, whichever of these mechanisms is employed for moving the bearing 52.

Figure 3:
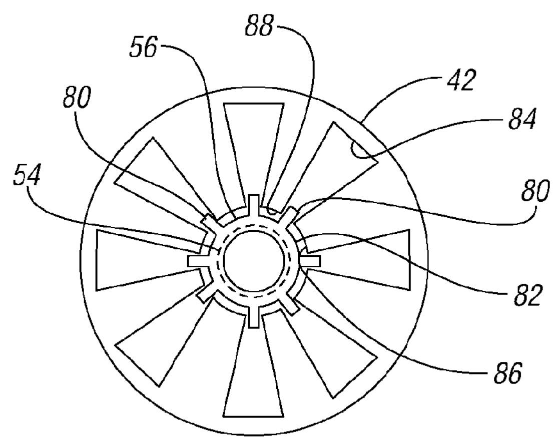
FIG. 3 is a schematic illustration in front view of a spring plate included within the dry friction launch clutch of FIGS. 1 and 2 interconnecting with a sleeve coaxially aligned with a center axis of the transmission.

Referring to FIG. 3, the radially extending hub 56 of the sleeve 54 is shown interconnected with the spring plate 42. The hub 56 is castellated with extensions 80 and notches 82 that interfit with mating notches 84, and extensions 86 at a radially inner circumference 88 of the spring plate 42. Thus, the sleeve 54 rotates with the spring plate 42.

Referring to the structure shown and described with respect to FIGS. 1-3, a method of redesigning a powertrain includes providing an automatic transmission 17 having a torque converter (not shown, but disposed axially where the dry friction launch clutch 32 is in FIGS. 1 and 2) with a predetermined control requirement. The method further includes replacing the torque converter with a dry friction launch clutch 32 having the same predetermined control requirement. As discussed above, the predetermined control requirement may be a volume of hydraulic fluid utilized for controlling the torque converter (e.g., for engaging or disengaging a torque converter clutch that allows torque from the engine to by-pass the torque converter). Alternatively, the predetermined control requirement may be a PWM signal provided by a control unit to control the torque converter clutch; the same PWM signal may instead be used to control an electric motor 65 that, via a throwout fork 71, moves a bearing 52 axially to pivot a spring plate 42 and thereby engage or disengage a clutch disk 48 with a braking plate 37.

Figure 4:
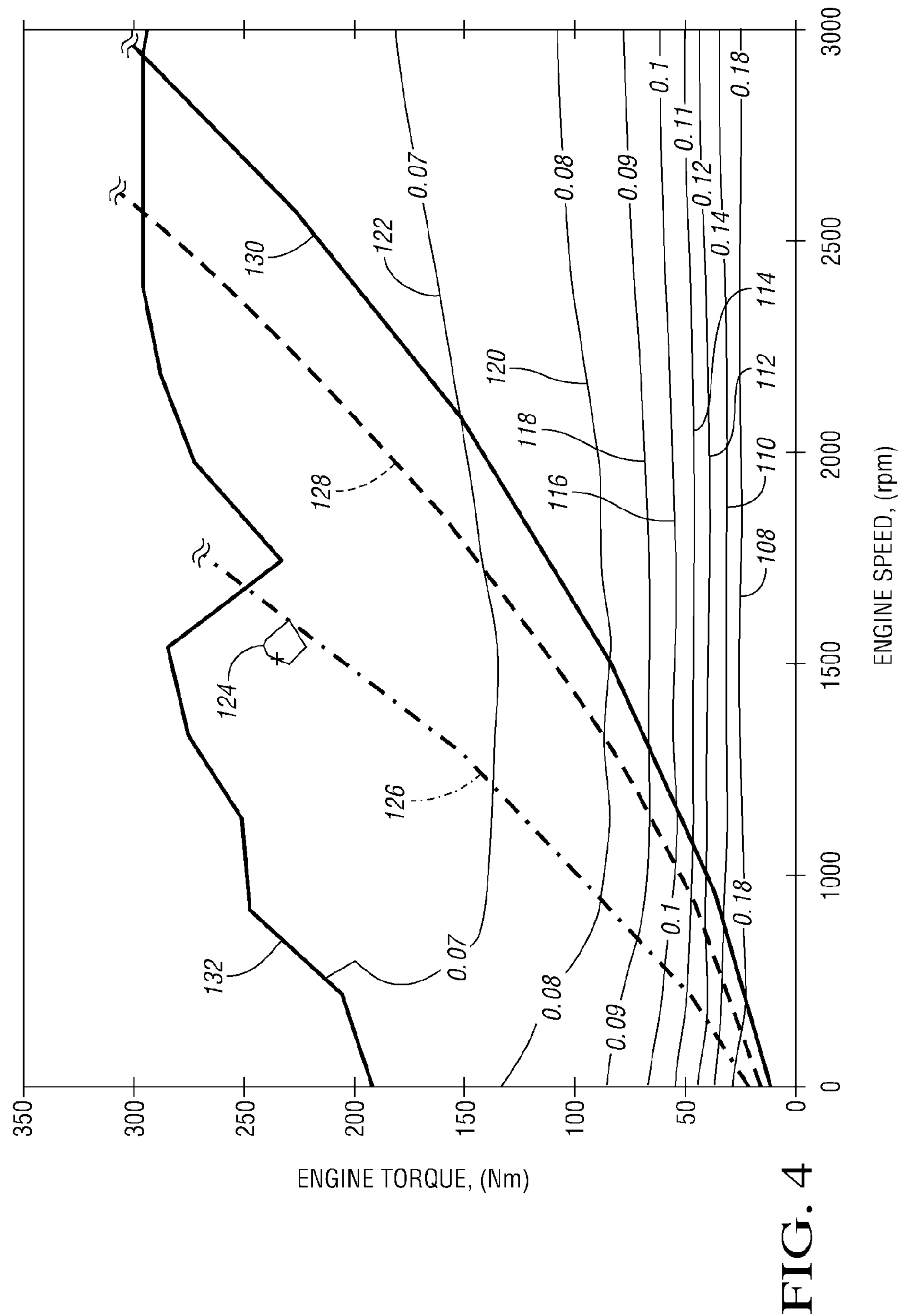
FIG. 4 is a graph of engine torque (Nm) versus engine speed (rpm) indicating brake specific fuel consumption (g/s/kW) for a variety of transmissions, including a transmission such as that of FIG. 1.

Referring to FIG. 4, a graph of engine torque (Nm) versus engine speed (rpm) illustrates various, constant brake specific fuel consumption (BSFC (g/s/kW)) lines as follows:

line 108=0.18 g/s/kW; line 110=0.14 g/s/kW; line 112=0.12 g/s/kW;

line 114=0.11 g/s/kW; line 116=0.10 g/s/kW; line 118=0.09 g/s/kW;

line 120=0.08 g/s/kW; line 122=0.07 g/s/kW; line 124=0.065 g/s/kW.

Improved fuel economy is indicated by a low BSFC, as is well understood by those skilled in the art.

Curve 126 illustrates the torque performance of an engine in a powertrain having a dry friction launch clutch within the scope of the invention; specifically, a dry friction launch clutch equivalent to a torque converter having a K-factor of 110, with an engine running according to a fuel economy cycle. (K-factor is an efficiency measurement for a torque converter and is equivalent to $$\frac{\text{rotational speed}}{\sqrt{\text{torque}}}$$

as is known by those skilled in the art. A lower K-factor indicates a more efficient torque converter. Curve 128 illustrates the torque performance of the engine in a powertrain having another dry friction launch clutch within the scope of the invention; specifically, a dry friction launch clutch equivalent to a torque converter having a K-factor of 150 with the engine running at wide open throttle. Curve 130 illustrates the torque performance of the engine in a powertrain having a conventional torque converter with a K-factor of 172. Finally, curve 132 indicates the torque performance of the engine at wide open throttle. As is clear from the graph of FIG. 4, for any given engine speed, curve 126 attains the lowest BSFC, curve 128 attains a greater BSFC and curve 130 attains the greatest BSFC. Thus, the dry friction launch clutch enables the achievement of a more targeted torque for a given input speed than does the torque converter with its fixed characteristic for torque versus speed (i.e., by utilizing controlled slip, a torque corresponding with a relatively low BSFC may be achieved by the dry friction launch clutch).

While the best modes for carrying out the invention have been described in detail, those familiar with the art to which this invention relates will recognize various alternative designs and embodiments for practicing the invention within the scope of the appended claims.

The invention of claimed is:

1. A powertrain for a vehicle, comprising:

an engine having an engine output member;

an automatic transmission having a transmission input member, a transmission output member, and a plurality of selectively engageable gears for transferring torque at multiple speed ratios from said transmission input member to said transmission output member; and a dry friction clutch connected between said engine output member and said transmission input member and selectively engageable to transfer torque from said engine output member to said transmission input member to launch the vehicle; wherein said dry friction clutch includes:

a pressure plate and a flywheel both mounted with respect to said engine output member for rotation therewith; and a clutch disk mounted with respect to said transmission input member for rotation therewith; wherein said pressure plate is selectively axially movable to contact said clutch disk, thereby engaging said flywheel with said clutch disk;

a spring plate mounted concentrically with respect to said engine output member for rotation therewith and pivotably connected with respect to said pressure plate; and a bearing positioned adjacent said spring plate, radially displaced from said pressure plate and selectively axially movable to pivot said spring plate with respect to said pressure plate, thereby moving said pressure plate axially away from said clutch disk to disengage said clutch disk from said flywheel;

a sleeve mounted coaxially with said transmission input member and having a radially-extending hub interconnecting with said spring plate for rotation therewith; and wherein said sleeve drives a pump for pressurizing fluid within said transmission.

2. The powertrain of claim 1, wherein said dry friction clutch further comprises:

an actuator having a cylinder and a piston selectively slideable axially within said cylinder and connected with said bearing to move said bearing.

3. The powertrain of claim 1, further comprising:

a motor having a shaft operatively connected with said bearing; wherein said motor is selectively operable for turning said shaft to thereby move said bearing.

4. The powertrain of claim 3, further comprising:

a throwout fork operatively connected between said shaft and said bearing; wherein said throwout fork is axially moved by said turning shaft to thereby move said bearing.

5. The powertrain of claim 1, wherein said hub and said spring plate are castellated for interconnection with one another.

6. The powertrain of claim 1, further comprising:

a damping element operatively connected between said clutch disk and said transmission input shaft for damping engine vibration.

7. The powertrain of claim 1, wherein said transmission input member and said dry friction clutch are coaxial.

* * * * *